United States Patent
Robinson (10) Patent No.: US 7,668,833 B2
(45) Date of Patent: Feb. 23, 2010

(54) INVOLVING PARTICIPANTS IN A DISTRIBUTED TRANSACTION

(75) Inventor: Ian Robinson, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 11/006,877

(22) Filed: Dec. 8, 2004

(65) Prior Publication Data
US 2005/0144171 A1 Jun. 30, 2005

(30) Foreign Application Priority Data
Dec. 24, 2003 (GB) ................ 0329930.2

(51) Int. Cl.
G06F 7/00 (2006.01)
G06F 17/30 (2006.01)

(52) U.S. Cl. ...................................... 707/10
(58) Field of Classification Search ............. 707/8, 707/10
See application file for complete search history.

(56) References Cited

U.S. PATENT DOCUMENTS

| | | | | |
|---|---|---|---|---|
| 5,920,863 A * | 7/1999 | McKeehan et al. ............ | 707/10 |
| 5,926,816 A | 7/1999 | Bauer et al. .................... | 707/8 |
| 6,138,143 A * | 10/2000 | Gigliotti et al. ............ | 709/203 |
| 6,237,018 B1 * | 5/2001 | Chessell ..................... | 718/101 |
| 6,266,698 B1 * | 7/2001 | Klein et al. .................. | 709/227 |
| 6,463,456 B1 * | 10/2002 | Kan et al. .................... | 709/201 |
| 6,772,176 B1 * | 8/2004 | Saha et al. ................... | 707/201 |
| 2002/0184239 A1 * | 12/2002 | Mosher et al. .............. | 707/200 |
| 2004/0088717 A1 * | 5/2004 | Chen et al. .................. | 719/321 |
| 2005/0144299 A1 * | 6/2005 | Blevins et al. .............. | 709/230 |

FOREIGN PATENT DOCUMENTS

EP 0657813 A 9/1995

OTHER PUBLICATIONS

X/Open Company, "Distributed Transaction Processing: The XA Specification", Dec. 1991, X/Open Company Ltd., 94 Pages.*

* cited by examiner

Primary Examiner—John R. Cottingham
Assistant Examiner—James E Richardson
(74) Attorney, Agent, or Firm—Patents on Demand, PA; Brian K. Buchheit (57) ABSTRACT

The present invention provides a method, apparatus, computer program product, and service which enables a transaction manager in a first system to co-ordinate database updates made in a second system database without requiring communication with the second system during transaction completion processing (commit or rollback) or any requirement for transaction logging or involvement in transaction recovery in the second system. This is achieved by carrying out the database updates in the second system in an XA transaction branch that is started are co-ordinated in the first system. Further this is done transparently to the application in the second server which makes the updates and enables the application in the first and second server to share locks such that both can access the same database.

19 Claims, 4 Drawing Sheets

INVOLVING PARTICIPANTS IN A DISTRIBUTED TRANSACTION

FIELD OF THE INVENTION

The present invention relates to involving participants in distributed transaction which spans disparate environments where the responsibility for transaction completion, logging and recovery can be contained within a single environment.

BACKGROUND TO THE INVENTION

Distributed applications are typically deployed in application server frameworks that exploit a specific distributed application architecture. Examples of such architectures are CORBA, J2EE, and .NET. An application server framework based on a specific architecture might typically be implemented using a specific set of technologies and be predisposed to supporting applications designed for the architecture supported by the application server. For example, a J2EE server is typically written for Java-based applications. Further foreign (or legacy) applications, for example databases, that were not designed with this architecture in mind can often be accessed through adaptive layers. For example, J2EE applications can access relational databases, such as DB2, through a JDBC adaptive layer. Adaptive layers like JDBC are good solutions for pervasive applications such as relational databases.

However, some legacy applications can be very specialised such that providing an adaptive layer to access them from a server framework based on a very different specific architecture can be expensive. For example, an application in a 'C'-based system which has a complex relationship with a relational database through its 'C' interface could be very difficult to deploy in the Java J2EE environment. One of the problems is that the middleware infrastructure to support distributed transactions is embodied by the J2EE application server in a Java virtual machine, whereas the resource access, which needs to occur under transaction control, happens in the 'C'-based legacy system.

Relational databases can typically support external co-ordination, for example, through either a 'C'-based system using XA functions or through a Java based system, such as provided by a J2EE server, using a Java XAResource interface. In such systems for transactional access of data resources there needs to be an association between an application's connection to the database on which data resource exists and the distributed transaction under which the data is accessed. As a result there exists a problem in that if a transaction manager which provides transaction support is only available in the Java based environment and the data resource access occurs in the 'C'-based environment, where the JVM based transaction manager is not available making the association very difficult.

Further, the problem is more complicated if access to the same data resource is required from both a Java and "C" based system within a single transaction because this results in a need to share locks. Whilst the XA specification describes this for a "tightly-coupled" transaction in which two threads of the same process access the same data resources within a single transaction based, this is based on a single process and a high degree of co-operation between the threads. However this does not provide for sharing rescues in a single transaction across disparate systems where such co-operation difficult, for example where one system is a Java based environment and another system is a 'C'-based environment.

A possible solution to these problems is to provide a 'C'-based transaction manager (TM) to co-ordinate the C updates and have this 'C'-based TM subordinate to the Java TM. But this requires the significant overhead of providing a TM for the 'C'-based system which employs a different architecture from the J2EE server—for example a CORBA server which supports Object Transaction Service (OTS). Providing a TM which supports multiple middleware architectures has a cost in terms of both skills and maintenance and may not be acceptable.

SUMMARY OF THE INVENTION

Accordingly according to a first aspect the present invention provides a data processing method of a transaction wrapper in a first environment to enable execution of a unit of work under the scope of a transaction started and co-ordinated in a second environment, the method comprising the steps: receiving a remote request for a unit of work to be executed in the first environment; obtaining a transaction identifier of a transaction started and co-ordinated in the second environment from the request; using the transaction identifier to inform a resource manager that the unit of work is to join the transaction such that the resource manager associates resource updates carried out by the unit of work to be part of the transaction; and after execution of the unit of work, informing the resource manager that the unit of work has completed participation in the transaction; wherein the resource manager is informed of completion of the transaction from the second environment.

According to a second aspect the present invention provides a data processing system for providing a transaction wrapper in a first environment to enable execution of a unit of work under the scope of a transaction started and co-ordinated in a second environment, the system comprising: means for receiving a remote request for a unit of work to be executed in the first environment; means for obtaining a transaction identifier of a transaction started and co-ordinated in the second environment from the request; means for using the transaction identifier to inform a resource manager that the unit of work is to participate in the transaction such that the resource manager associates resource updates carried out by the unit of work to be part of the transaction; and means for, after execution of the unit of work, informing the resource manager that the unit of work has completed participation in the transaction; wherein the resource manager is informed of completion of the transaction from the second environment.

According to a third aspect the present invention provides a computer program product comprising instructions which, when executed on a data processing system, cause the system to carry out a method according to the first aspect.

Accordingly the unit of work carried out in the first environment is completed (committed or rolled back) without involving the first environment in the transaction completion flows. As a result the first environment does not have any responsibility for transactional logging and recovery and the same data resources of the resource manager can be accessed under the same transaction but from two disparate environments. Further the transaction wrapper involves the unit of work in the transaction transparently to unit of work which is therefore unaware of its participation in the transaction.

There are a variety of manners by which the resource manager can be informed of the transaction identifier under which a local unit of work should participate. For example it can be informed of the transaction identifier by the transaction manager flowing a request to the database to join the transaction prior to starting the execution of the unit of work.

The request informs the database of the transaction identifier of the transaction which is to be joined and under which the unit of work will be performed. Such a request is normally flowed on the same thread as the thread on which the unit of work is performed. Alternatively, for example, during execution of the request the transaction wrapper receives a request from the database for details of a transaction under which to perform the unit of work. In response to this request the transaction wrapper provides to the resource manager the transaction identifier of the transaction to be joined.

Optionally the request also includes details of a resource manager which has previously been accessed using the transaction identifier. As a result the resource manager associated with the transaction identifier can be obtained by the transaction wrapper. This can be useful as an indication of the correct resource manager to involve in the transaction as the first environment may have access to a plurality of resource managers.

According to a fourth aspect the present invention provides a data processing method of a transaction client in a second environment to enable execution of a unit of work carried out in a first environment under the scope of a transaction started and coordinated in the second, the method comprising the steps: receiving an outbound request from an application for a unit of work to be performed in a first environment as part of a transaction; obtaining a transaction identifier for the transaction; adding the transaction identifier to the request; receiving a response to the outbound request, wherein the unit of work performed in the first second environment accessed a resource manager under the scope of the transaction; and informing the resource manager of completion of the transaction, thereby completing the unit of work carried out in the first environment from the second environment;

According to a fifth aspect the present invention provides a data processing system for providing a transaction client in a second environment to enable execution of a unit of work carried out in a first environment under the scope of a transaction started and co-ordinated in the second environment, the system comprising: means for receiving an outbound request from an application for a unit of work to be performed in a second environment as part of a transaction; means for obtaining a transaction identifier for the transaction; means for adding the transaction identifier to the request; means for receiving a response to the outbound request, wherein the unit of work performed in the second environment accessed a resource manager under the scope of the transaction; and means for informing the resource manager of completion of the transaction, thereby completing the unit of work carried out in the second environment from the first environment;

According to a sixth aspect the present invention provides a computer program product comprising instructions which, when executed on a data processing system, cause the system to carry out a method according to the fourth aspect.

Preferably the requests to and from the resource manager are based on the XA specification. In this case the transaction identifier comprises and identifier for the transaction and a branch qualifier.

Note that the transaction wrapper and client could be termed "thin" because they do not include most of the capabilities associated with a transaction manager, for example the ability to track participants in a transaction, co-ordinate or take part on the completion or recovery of a transaction, and to create transaction identifiers.

For example the first environment could be provided by a data processing host, or server process, which is executing a Java based or "C" based environment which does not include a transaction manager implementation. For example the second environment could be provided by a data processing host, or server process, which is executing a J2EE Application Server environment with a JTA transaction manager, or alternatively a CORBA server environment with a JTS transaction manager. In this second environment the transaction manager is responsible for transaction completion, logging and recovery.

BRIEF DESCRIPTION OF THE DRAWINGS

The invention will now be described, by way of example only, with reference to a preferred embodiment thereof, as illustrated in the accompanying drawings, in which.

DESCRIPTION OF THE PREFERRED EMBODIMENTS

Figure 1:
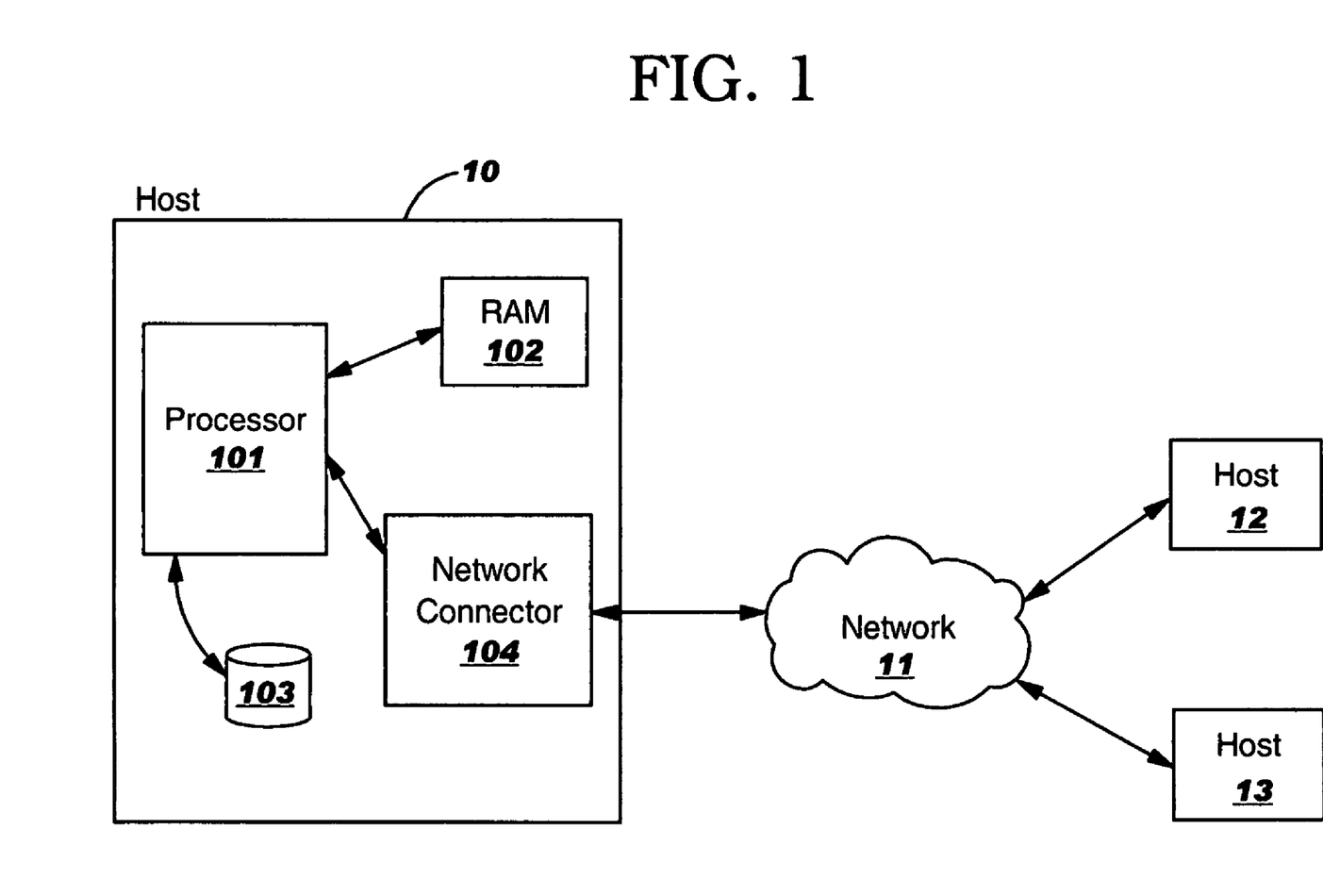
FIG. 1 is a block diagram of a data processing environment in which the preferred embodiment of the present invention can be advantageously applied.

FIG. 1 is a block diagram of a data processing environment in which the preferred embodiment of the present invention can be advantageously applied. In FIG. 1, a client/server data processing host 10 is connected to other client/server data processing host 12 and 13 via a network 11, which could be, for example, the Internet. A java based transaction environment may be installed on any such client/server and make transactional requests to applications running in a "C" based environment installed on any other client/server. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Figure 2:
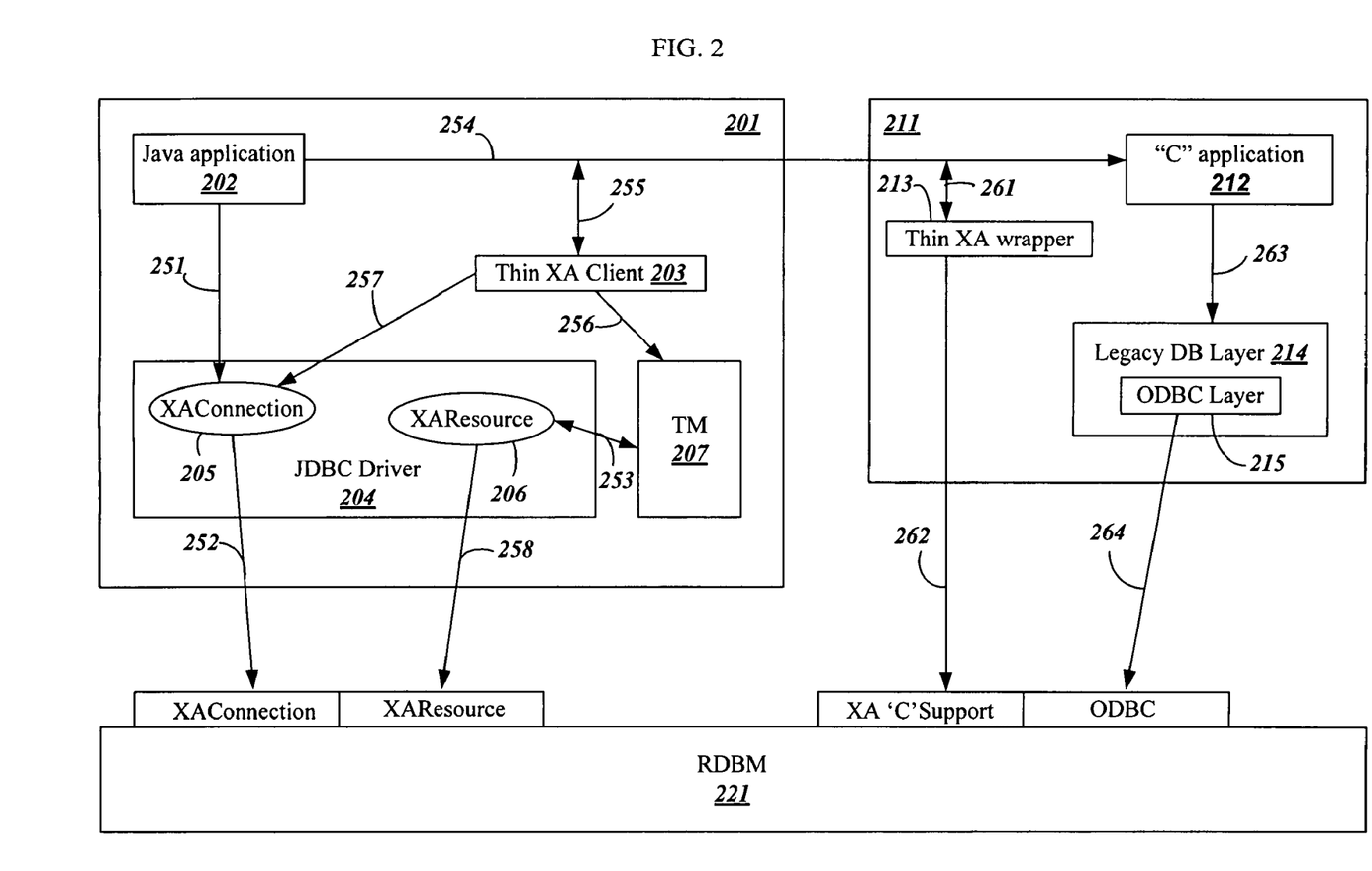
FIG. 2 is a schematic diagram of a transaction sharing a resource between a Java based system with a transaction co-ordinator and a legacy "C" based system without at transaction co-ordinator.

FIG. 2 is a schematic diagram of the main components involved in a transaction sharing a database resource between a Java based system 201 with a transaction manager (co-ordinator) 207 and a legacy "C" based system 211 without a transaction manager, according to the preferred embodiment of the invention. Notably the figure includes a Thin XA Client 203 in the Java based system and an Thin XA Wrapper 213 in the legacy "C" based system.

FIG. 2 assumes that a Java application 202 is running under the scope of a transaction and as a result the figure does not show how the transaction is started. In practice this could be done, for example, by a call from the Java application to the transaction manager 207 or, for example, if the Java application is an Enterprise Java Bean (EJB), by a J2EE container (not shown) on behalf of the Java application. When the application wishes to access the database 221 it first obtains (251) an XAConnection object 205 which, if necessary, connects to the database (may not be necessary because an XAConnection can be re-used), and then accesses (252) the database through that XAConnection object. However note that a Java application would not normally access an XAConnection object directly but do this through one or more objects provided by the middleware of the server, for example a Java Connection Architecture (JCA) implementation.

Prior to the Java application's first access (252) to the database within the scope of a transaction (global transaction), the transaction manager obtains (253) an XAResource object 206 associated with the XAConnection object 205 and starts a transaction branch in the database (258), specifying to the database an XA transaction Id (XID) associate with the global transaction. The XAResource object 206 represents, to the global transaction manager, the participation of the database in the transaction. In this way, when the global transaction finally completes, the transaction manager will drive completion of the XA database updates which were done under the scope of the XA transaction branch, through the XAResource object 206.

Note that an XA transaction id (XID) is made up of two parts (full XID), the first part is a transaction identifier which identifies the global transaction and the second part is a branch qualifier which identifies the XA transaction branch of the global transaction. Individual XA branches of a global transaction (i.e: two XA transaction branches with the same transaction identifier but different branch qualifier) have individual isolation characteristics and depending on those isolation characteristics may or may not be able to access the same data under the global transaction. For example under a given global transaction a second XA transaction branch may not be able to access data in a database which has been accessed under the scope of a first XA transaction branch which has not yet completed (committed or rolled back).

After accessing the database the Java Application 202 sends (254) a request to a remote "C" application 212 to perform a unit of work under the scope of the global transaction. However, before the request leaves the server, control is passed to the Thin XA Client 255, effectively intercepting the request. The Thin XA client obtains (256) the XID from the Transaction Manager 207 and then suspends (257) the XA transaction branch by requesting the XAConnection object 205 to flow xa_end(TMSuspend) to the database. Having suspended the XA transaction branch the Thin XA Client adds the full XID (transaction identifier and branch qualifier) to the request, for example as part of a context that is flowed with the request. The request is then allowed to flow to the server 211 in which the "C" application 212 resides.

When the request arrives in server 211 control is passed (261) to the Thin XA wrapper 213 using the same thread on which the "C" application is to execute, effectively intercepting the request. The Thin XA wrapper then obtains the full XID associated with the active transaction from the request and uses it to ensure that any updates to the database made by the "C" application are done under the scope of the same XA transaction branch as the Java application 202. To do this the Thin XA wrapper must first ensure that there is an open XA connection to the database from the thread on which it is executing and as a result, flows (262) an xa_open( ) request to the database if the thread does not already have an XA connection open to the database. Note that the Thin XA wrapper could either keep track of the threads on which it has opened XA connections to the database so that it must only be done once for each thread, alternatively it could open and close the connection each time the thread is used to process an inbound request. Assuming an open XA connection exists the XA wrapper uses the XID obtained from the request to involve database updates made by the "C" application under the scope of the same XA transaction branch as the database updates made by Java application 202. It can do this using either static or dynamic registration. If static registration is used the Thin XA client flows an xa_start(TMJOIN) request to the database before allowing the request to proceed to the application. If dynamic registration is used the request is allowed to proceed to the application and the Thin XA Client provides an ax_reg( ) function which the database calls when the "C" application first accesses the database, the function returning TMJOIN when called.

The remote request is then provided to the "C" application which uses (263) the DB Layer 214 to access (264) the database 221. However, although this database is also being accessed by the Java application 202 (i.e.: has been updated under the scope of an as yet incomplete XA transaction branch) and as a result such access would normally be refused, in this case it is permitted because it is done under the same XA transaction branch as the Java application. This is made possible because the full XID (transaction identifier and branch qualifier) was flowed from the Thin XA Client 203 in server 201 to the Thin XA Wrapper 213 in server 211, and the Thin XA Wrapper ensured that database access by the "C" application is done under the scope of an XA transaction branch identified by the full XID. This means that the database associates the work carried out by the "C" application with the XA transaction branch of the Java application.

Now, when the "C" application finishes processing the request and returns a response to the Java application, the Thin XA wrapper is given control. The Thin XA wrapper then completes any XA transaction branch which was started as part of processing the request. It does this by flowing xa_end (TMSUCCESS) to the database if either an xa_start was previously flowed when the request was received or and ax_reg( ) was received when the "C" application was processing (note it is not flowed if dynamic registration is being used and an ax_reg( ) call was not received. Ending the XA transaction branch in this way does not prevent it being subsequently resumed on the same or a different thread in the same or a different server, but ensures that the database does not require another XA flow for the same branch to be received from the same thread. The response then flows to server 201 and Java Application 202.

When the response arrives in server 201, the Thin XA Client 203 is given control and it resumes any XA transaction branch which was suspended when processing the outbound request. This is done by requesting (257) the XAConnection object 205 to resume the transaction branch, for example by flowing xa_(TMRESUME) for the XA transaction branch to the database. The response is then allowed to flow to the Java application 202.

Now when the transaction finally commits the work done on the database by the "C" application 212 is associated with the same XA transaction branch as the Java application 202 and as a result is logically considered, by the database, to be part of the work done by the Java application. Such work is represented by the XAResource object (206) previously created when the Java application first accessed the database under the scope of the XA transaction branch. As a result, during completion processing, when the transaction manager directs (257) the XAResource object 206 to complete (commit or rollback) the database updates made under the XA transaction branch which the XAResource object represents, the XAResource passes (258) this request to the database which acts on all database updates for the given XA transaction branch which includes any updates made by both the Java application 202 and "C" application 212. Accordingly the database updates carried out under the XA transaction branch in server 211 are committed by XA completion flows from server 201, without having to involve server 211 in the completion processing for the transaction.

Note that in the preferred embodiment the Java application 202 could make several requests for the "C" application 212 to do work under the scope of the transaction and each time the Thin XA wrapper 213 will join the end the XA transaction branch.

Further note that in an alternative embodiment, for example, the Java application 202 could send a request to the "C" application 212 via a proxy object in server 201. Such a proxy object could, for example, be the Thin XA Client 203 or an object which invokes, directly or indirectly, an object which represents the Thin XA Client. Further in this embodiment the full XID could be passed to the proxy object, and Thin XA client, as a parameter on the request. Similarly a proxy object could be configured in server 211 such that requests to and responses from the "C" application 212 are made through the proxy object. Such a proxy object could, for example, be the Thin XA Wrapper 213 or could be an object which invokes, directly or indirectly, an object which represents the Thin XA Wrapper. Further, in this case the XID can be passed to it as a parameter on a call to the proxy, rather than as part of a context included with the flow.

Note that server 201 which contains the transaction manager could be, for example, a J2EE Application Server with a JTA transaction manager, or alternatively a CORBA server with a JTS transaction manager, that co-ordinates resource managers through their Java XAResource interfaces.

Figures 3A, 3B:
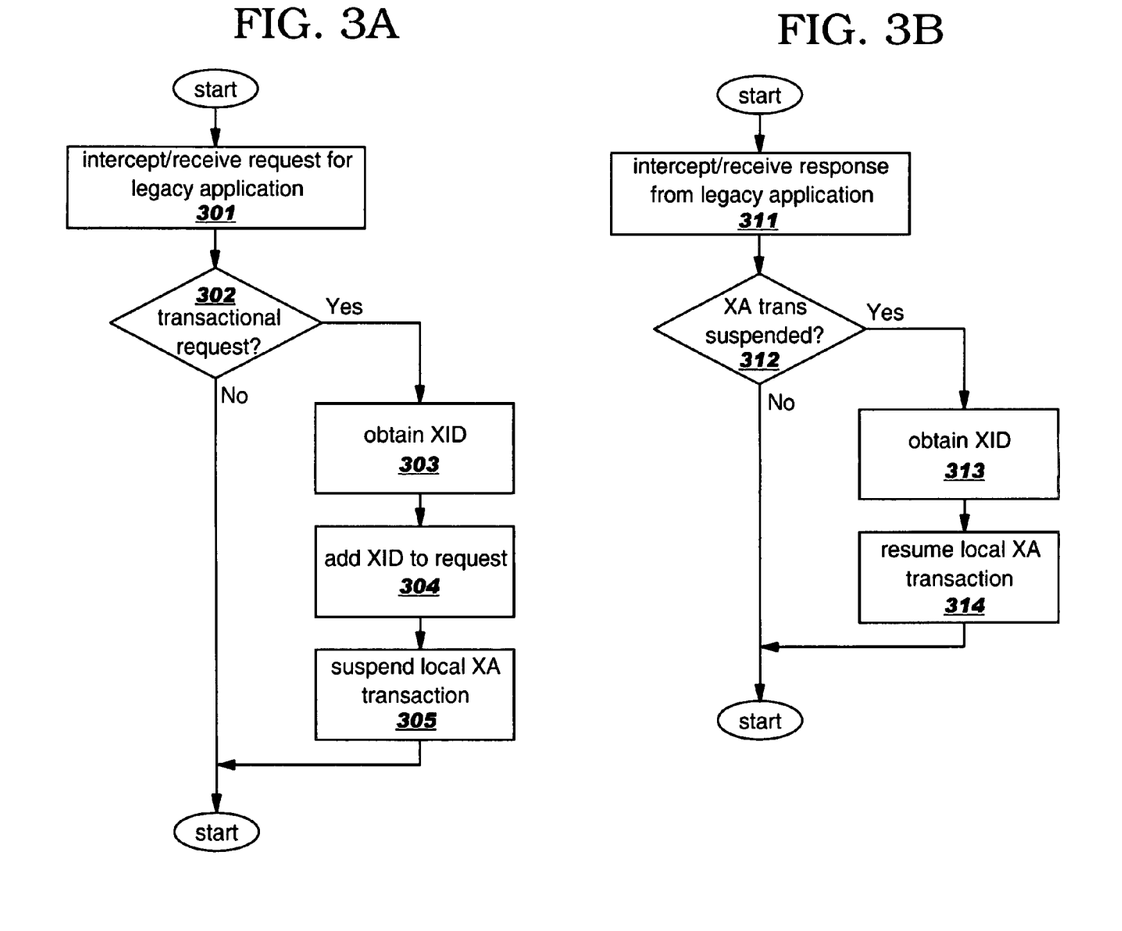
FIGS. 3a and 3b are flow diagrams of the method followed by the Java based system or FIG. 2.

FIGS. 3a and 3b show the method steps followed by the Thin XA Client (203 of FIG. 2) according to the preferred embodiment of the present invention. FIG. 3a is for an outbound transactional request and FIG. 3b for an inbound flow of a response to that request.

In FIG. 3a at step 301 an outbound transactional request to a remote server is either intercepted or received, for example with reference to FIG. 2, a request from the Java application 202 to the "C" application 212 to perform a unit of work which is intercepted/received in server 201. For example, the outbound request will be intercepted if during normal processing of the outbound request the thin XA client is called to add information to a context flowed with a request. Note that interception of requests in this manner is well known in art. For example the outbound request will be received if the call is made via a local proxy object which represents the remote application, and the local proxy invokes directly or indirectly the thin XA Client. At step 302 a check is made to see if the request is transactional and such information can be obtained from the Transaction manager (207 of FIG. 2) which maintains knowledge of active transaction to thread affinity. The request is considered transactional if it is being made from a thread associated with an active transaction. If a transaction is active the XA transaction id (XID) is obtained from the transaction manager at step 303, this being the XID that is associated with any database work done by the Java application under the active transaction, and includes a transaction id and branch qualifier. At step 304 the XID is added to the remote request, for example as part of a context associated with the request, or for example, as a parameter to a call to a remote proxy object which represents the remote application. At step 305 the XA transaction with the database is suspended by flowing an xa_end(TMSUSPEND) request to the database. The remote request is then allowed to flow to the remote server.

In FIG. 3b at step 311 the response to the remote request processed according to FIG. 3a is intercepted or received via a proxy object, depending on the processing of step 301 of FIG. 3a. At step 312 a check is made to see if an XA transaction was suspended at step 305 of FIG. 3a, for example such information may have been saved in memory associated with the thread or can be assumed based on an active transaction is associated with the thread. If an XA transaction was suspended at step 305 of FIG. 3a, at step 313 the XID of the active transaction is obtained. For example the XID may be obtained from a context included with the response, or as a parameter on the response, from the Transaction Manager, or based on retention in memory of the value obtained at step 303 of FIG. 3a. Once the XID has been obtained, the XA transaction with the database is resumed by flowing an xa_end(TMRESUME) request to the database. The response is then allowed to flow to the Java application which made the request.

Figure 4A:
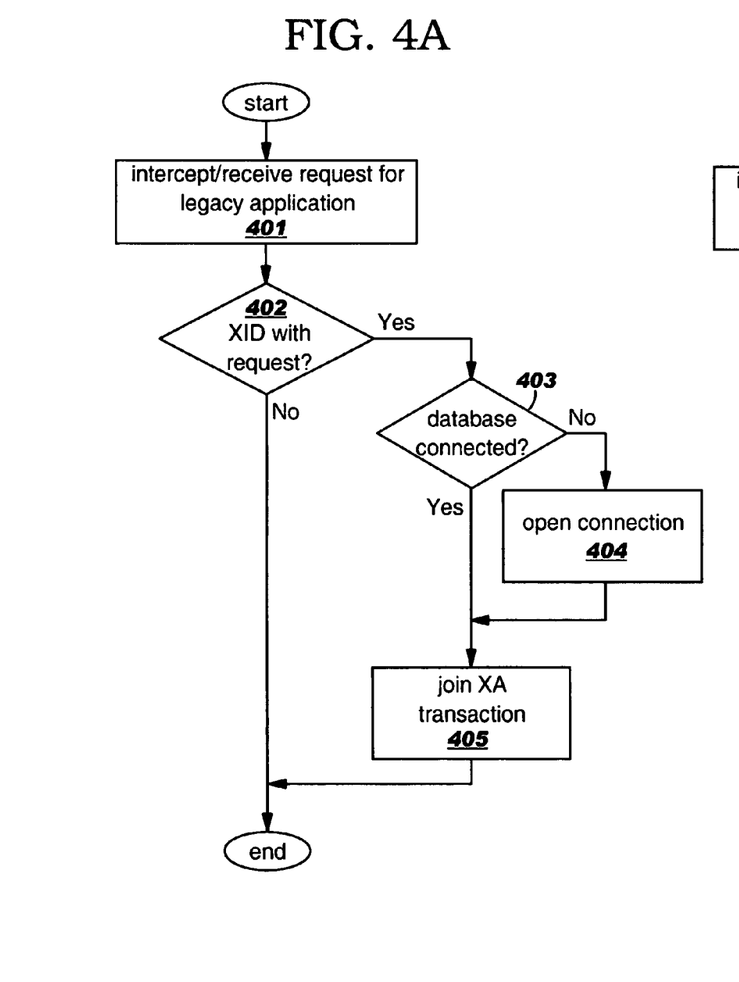
FIGS. 4a and 4b are flow diagrams of the method followed by the legacy "C" based system of FIG. 2.
Figure 4B:
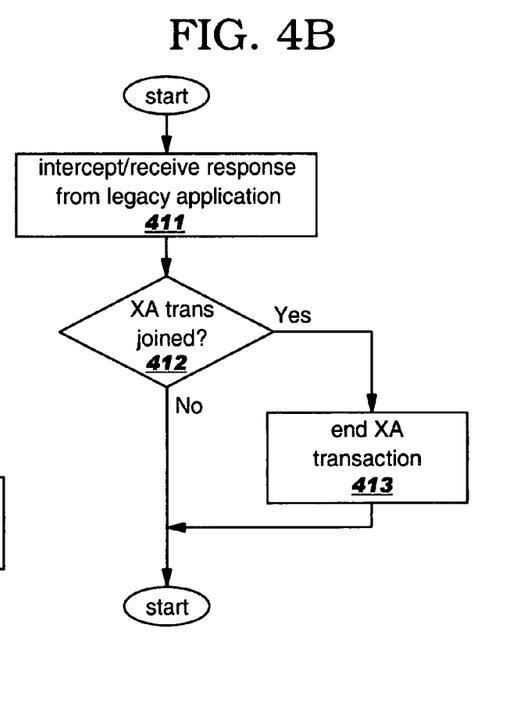

FIGS. 4a and 4b show the method steps followed by the Thin XA Wrapper (213 of FIG. 2) according to the preferred embodiment of the present invention. FIG. 4a is for an inbound transactional request and FIG. 4b for an outbound flow of a response to that request.

In FIG. 4a at step 401 an inbound transactional request from a remote server is either intercepted or received, for example with reference to FIG. 2, a request from the Java application 202 to the "C" application 212 to perform a unit of work which is intercepted/received in server 211. For example, the outbound request will be intercepted if during normal processing of the inbound request the thin XA wrapper is called to obtain information from a context flowed with a request. Note that interception of requests in this manner is well known in art. For example the inbound request will be received if the call is made via a local proxy object which represents the local application which is the target of the request, and the local proxy invokes directly or indirectly the thin XA wrapper. At step 402 a check is made to see if an XID was received with the request. If an XID was not received the thin XA wrapper does nothing and any database updates done by the "C" application are not involved in a transaction. However, if an XID was included with the request, at step 403 a check is made to see if an XA connection to the database is open under which any updates to the database, by the "C" application, may be made. Note that typically XA connections to a database are associated with threads and as a result this requires an open XA connection on the thread on which the "C" application executes. However, in some databases XA connections may have different associations, for example to a process, such that one XA connection is associated with all threads in a process. If a suitable XA Connection is not available one is opened at step 404. Finally at step 405, assuming static registration is being used, xa_(TMJOIN) is flowed, specifying the full XID received, to database in order to ensure that any database updates done by the "C" application are done under the XA transaction branch defined by the XID. The flow is then allowed to proceed to the "C" application.

Note that if dynamic registration is used step 405 would ensure that the XID was available such that when the database subsequently calls an ax_reg( ) function the thin XA wrapper can return the XID which it received with the request.

In FIG. 4b, at step 411 the response to the request processed according to FIG. 4a is intercepted, or received via a proxy object, depending on the processing of step 401 of FIG. 4a. At step 412 a check is made to see if an XA transaction branch was joined at step 406 of FIG. 4a, and if so, at step 413 the transaction branch is ended by flowing xa_end(TMSUCCESS) to the database. Note that xa_end(TMSUCESS) indicates to the database that the updates were completed successfully and can be subsequently committed. The response is then allowed to flow back to the sender of the original request and will accordingly be processed according to FIG. 3b, as previously described.

Note that if the "C" application fails in some way such that unit of work which it performs fails, the "C" application may throw an exception or return a response which indicates this failure. In this case the remote requester can process the failure and ensure that the global transaction is rolled back. In another embodiment the transaction wrapper could become aware of this failure at step 411 of FIG. 4b and as a result flow xa_end(TMFAIL) at step 413 of FIG. 4b. For example the XA transaction wrapper can become aware of this because it is implemented using a proxy object which catches the exception or inspects the return code. Alternatively if it is implemented as an interceptor it can be passed this information when it is called.

Accordingly, the preferred embodiment of the present invention enables a transaction manager in a first system to co-ordinate database updates made in a second system database without requiring communication with the second system during transaction completion processing (commit or rollback). This is achieved by carrying out the database updates in the second system in an XA transaction branch that is started are co-ordinated in the first system. Further this is done transparently to the application in the second server which makes the updates and enables the application in the first and second server to share locks such that both can access the same database. Further because of the transparency to the application in the second server there is no need for it to be re-written to take advantage of the invention.

Note that a skilled person in the art would realise that the methods described with reference to FIGS. 3a, 3b, 4a, and 4b could be implemented in a variety of programming languages, for example, Java™, C, and C++ (Java is a registered trademark of Sun Microsystems, Inc. in the United States, other countries, or both.). Further a skilled person would realise that once implemented the methods can be stored in a computer program product comprising one or more programs, in source or executable form, on a media, such as floppy disk, CD, and DVD, suitable for loading onto a data processing host and causing the data processing host to carry out the methods. Further a skilled person would realise that the methods described with reference to FIG. 4 could be embodied in a data processing apparatus and further in providing a service which supports transaction involvement of resources in a database.

The invention claimed is:

1. A method of processing data in a first data environment to enable execution of a unit of work under the scope of a global transaction staffed and co-ordinated in a second data environment, the method comprising the steps:

starting and co-ordinating a transaction branch of the global transaction with a shared database, the starting and co-ordinating occurring in the second data environment, and producing a transaction branch identifier, the shared database being shared and accessible by both the first and second data environments;

suspending the transaction branch at the shared database by the second data environment;

receiving a remote request from the second data environment at the first data environment for a unit of work to be executed in the first data environment as part of the transaction branch, the remote request including the transaction branch identifier;

obtaining the transaction branch identifier in the first data environment;

using the transaction branch identifier to resume the transaction branch at the shared database by the first data environment and inform the shared database that the unit of work is to join the transaction branch such that the shared database associates resource updates carried out by the unit of work to be part of the transaction branch; and after execution of the unit of work, informing the shared database that the unit of work has completed participation in the transaction and indicating to the second data environment that the unit of work is complete;

wherein the shared database is informed of completion of the transaction branch from the second data environment.

2. The method of claim 1 wherein the step of using the transaction branch identifier comprises the step of:

prior to execution of the unit of work, flowing a request to the shared database to join the transaction branch, the request including the transaction branch identifier of the transaction branch.

3. The method of claim 1 wherein the step of using the transaction branch identifier comprises the steps, during execution of the unit of work, of:

receiving a request from the shared database for details of a transaction branch; and returning to the shared database the transaction branch identifier and an indication that the transaction branch identified is to be joined.

4. The method of claim 1 further comprising the step of:

obtaining details of the shared database from the request.

5. A method of processing data in a first data environment to enable execution of a unit of work under the scope of a global transaction, the unit of work carried out in the first data environment as a transaction branch of the global transaction, the transaction branch started and co-ordinated in a second data environment, the method comprising the steps:

starting the transaction branch with a shared database from the second data environment, including producing a transaction branch identifier for the transaction branch, the shared database accessible by both the first and second data environments;

receiving an outbound request from an application in the second data environment for a unit of work to be performed on the shared database in the first data environment as part of the transaction branch, the outbound request being transmitted to an application in the first data environment, and the outbound request being received at a proxy object of the second data environment;

suspending the transaction branch at the shared database by the second data environment;

obtaining the transaction branch identifier for the transaction, performed by the proxy object in the second data environment;

adding the transaction branch identifier to the request, performed by the proxy object in the second data environment;

forwarding the outbound request, including the transaction branch identifier, to the first data environment, performed by the proxy object in the second data environment;

receiving a response to the outbound request from the first data environment at the second data environment, wherein the unit of work performed in the first data environment accessed the shared database under the scope of the transaction branch; and informing the shared database of completion of the transaction branch in the second data environment, thereby completing the unit of work carried out in the first data environment.

6. The method of claim 5 further comprising the method step of:

adding details of the shared database to the outbound request.

7. A data processing system to enable execution of a unit of work in a first data environment executed on a first client/server in a transaction branch under the scope of a global transaction started and co-ordinated in a second data environment executed on a second client/server, the system comprising:

means, in the second client/server, for starting a transaction branch of the global transaction at a shared database, including producing a transaction branch identifier to identify the transaction branch;

means, in the second client/server, for suspending the transaction branch and sending a request to the first client/server to perform a unit of work for the transaction branch, the request including the transaction branch identifier;

means, in the first client/server, for receiving the request for the unit of work to be executed in the first client/server;

means, in the first client/server, for obtaining the transaction branch identifier of the transaction branch from the request;

means, in the first client/server, for using the transaction branch identifier to inform the shared database that the unit of work is to join the transaction branch started and co-ordinated in the second data environment such that the shared database associates resource updates carried out by the unit of work to be part of the transaction branch; and     means for, after execution of the unit of work, informing the shared database that the unit of work has completed participation in the transaction branch;

wherein the shared database is informed of completion of the transaction branch from the second client/server.

8. The system of claim 7 the means for using the transaction branch identifier comprises:

means for, prior to execution of the unit of work, flowing a request to the shared database to join the transaction branch, the request including the transaction branch identifier of the transaction.

9. The system of claim 7 wherein means for using the transaction branch identifier comprises:

means for, during execution of the unit of work:

receiving a request from the shared database for details of a transaction branch; and     returning to the shared database the transaction branch identifier and an indication that the transaction branch identified is to be joined.

10. The system of claim 7 farther comprising:

means for obtaining details of the shared database from the request.

11. A data processing system to enable execution of a unit of work carried out in a first data environment executed on a first client/server under the scope of a global transaction, the unit of work completed by a transaction branch of the global transaction started and co-ordinated in a second data environment and executed on a second client/server, the system comprising:

means, in the second client/server, for initiating the transaction branch at a shared database, the shared database being accessible by both the first and second data environments;

means, in the second client/server, for receiving an outbound request from an application executed in the second data environment for the unit of work to be performed in the first data environment as part of the transaction branch;

means for obtaining a transaction branch identifier for the transaction branch in the second data environment, wherein the transaction branch identifier was obtained in the second data environment upon starting the transaction branch at the shared database from the second data environment;

means for suspending the transaction branch at the shared database from the second data environment;

means for adding the transaction branch identifier to the request in the second data environment;

means for forwarding the remote request with the transaction branch identifier to the first data environment;

means for receiving a response to the outbound request in the second data environment, wherein the unit of work performed in the first data environment accessed the shared database under the scope of the transaction branch; and     means for informing the database of completion of the transaction branch, thereby completing the unit of work carried out in the first data environment from the second data environment.

12. The system of claim 11 further comprising:

means for adding details of the shared database to the outbound request.

13. A computer program product comprising instructions stored on a computer readable medium which, when executed on a data processing system, cause the system to:

start a transaction branch of a global transaction with a shared database from a second data environment, starting the transaction branch producing a transaction branch identifier for the transaction branch;

suspend the transaction branch at the shared database from the second data environment;

receive a remote request at a first data environment for a unit of work to be executed in the first data environment from a second data environment, the remote request including the transaction branch identifier;

obtain the transaction branch identifier of the transaction branch started and co-ordinated in the second data environment from the remote request in the first data environment;

use the transaction branch identifier to inform the shared database that the unit of work is to join the transaction branch such that the database associates resource updates carried out by the unit of work to be part of the transaction branch, and wherein the database is shared by the first and second data environments; and     after execution of the unit of work, inform the shared database that the unit of work has completed participation in the transaction branch;

wherein the shared database is informed of completion of the transaction branch from the second data environment.

14. The computer program product of claim 13 wherein using the transaction identifier comprises:

prior to execution of the unit of work, flow of a request to the database to join the transaction, the request including the transaction identifier of the transaction.

15. The computer program product of claim 13 wherein the instruction for using the transaction branch identifier during execution of the unit of work causes the system to:

receive a request from the database for details of a transaction branch; and     return to the database the transaction branch identifier and an indication that the transaction branch identified is to be joined.

16. The computer program product of claim 13 wherein the instruction code further causes the system to:

obtain details of the database from the request.

17. A method, in a global transaction, of executing a transaction branch of the global transaction across first and second data environments on a shared resource, comprising:
- initiating a transaction branch with the shared resource by an application in the second data environment, the second data environment operating in a first language;
- suspending the transaction at the shared resource in the second data environment;
- transmitting a request to the first data environment from the application in the second data environment to complete the transaction branch in the first data environment, the first data environment operating in a second language that is different than the first language, the request including a transaction branch identifier identifying the transaction branch and a unit of work to be performed by an application in the first data environment;
- resuming the transaction branch from the first data environment with the shared resource;
- performing the unit of work by the application in the first data environment and updating the shared resource with the unit of work;
- sending a response to the request from the first data environment to the second data environment, including the transaction branch identifier, indicating that the transaction branch has completed; and
- closing the transaction branch at the shared resource from the second data environment in response to receiving the response to the request.

18. The method of claim 17, wherein transmitting the request comprises:
- in the second data environment, intercepting the request from the application in the second data environment by a local proxy object in the second data environment which represents the application in the first data environment;
- obtaining the transaction branch identifier from a transaction manager of the second data environment;
- adding a context to the request including the transaction branch identifier by the local proxy object, the context including the transaction branch identifier; and
- forwarding the request from the local proxy object to the first data environment.

19. The method of claim 18, wherein resuming the transaction branch comprises:
- invoking a wrapper in the first data environment by the local proxy object of the second data environment;
- receiving the request at the wrapper, wherein the wrapper performs obtaining the transaction branch identifier and resuming the transaction branch at the shared resource; and
- forwarding the request from the wrapper to the application in the first data environment.

* * * * *

UNITED STATES PATENT AND TRADEMARK OFFICE
CERTIFICATE OF CORRECTION

| | | |
|---|---|---|
| PATENT NO. | : 7,668,833 B2 | Page 1 of 1 |
| APPLICATION NO. | : 11/006877 | |
| DATED | : February 23, 2010 | |
| INVENTOR(S) | : Ian Robinson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Seventh Day of December, 2010

David J. Kappos
*Director of the United States Patent and Trademark Office*